United States Patent [19]

Loureiro et al.

[11] 3,816,352

[45] June 11, 1974

[54] SPRAY DRIED ALPHA-OLEFIN SULFONATE DETERGENT COMPOSITIONS

[76] Inventors: Valentin R. Loureiro, 54 Oak St., Allendale, N.J. 07401; Abraham Greenberg, 16 Crescent Dr., Parsippany, N.J. 07054

[22] Filed: Nov. 1, 1972

[21] Appl. No.: 302,689

[52] U.S. Cl.................. 252/556, 252/536, 252/537, 252/555
[51] Int. Cl............................................. C11d 1/12
[58] Field of Search ............ 252/536, 537, 555, 556

[56] References Cited
UNITED STATES PATENTS 3,640,880   2/1972   Martin ............................... 252/555
R27,096   3/1971   Walker ........................... 252/555 X

FOREIGN PATENTS OR APPLICATIONS 46-5823   2/1971   Japan................................ 252/536

Primary Examiner—Stephen J. Lechert, Jr.
Assistant Examiner—R. L. Tate
Attorney, Agent, or Firm—Jordan J. Driks; Albert L. Gazzola

[57] ABSTRACT

Dry powder compositions in the form of spray dried beads which are composed of alpha-olefin sulfonate, linear alkyl benzene sulfonate, starch hydrolysate, magnesium sulfate, sodium chloride and a sulfate filler in certain relative proportions.

5 Claims, No Drawings

SPRAY DRIED ALPHA-OLEFIN SULFONATE DETERGENT COMPOSITIONS

This invention relates to an improved bubblebath formulation in dry powder form. More particularly this invention relates to an alpha-olefin sulfonate formulation in the form of spray-dried beads particularly suitable for use as a bubblebath composition.

The successful formulation of commercially acceptable alpha-olefin sulfonate based dry powder detergent compositions has presented a number of formidable problems. More specifically, the adaptation of the conventional spray-drying methods of manufacture to compositions wherein the principal active ingredient is a sulfonated alpha-olefin has not been readily accomplished. Attempts to spray dry slurries containing significant proportions of a sulfonated alpha-olefin product have resulted in difficulties with regard to the density of the finished product, a tendency toward overdustiness and a fragile bead which breaks down in packaging and transport. It is highly important that commercially acceptable spray-dried beads retain the form of a hollow, spherical bead, this form being essential for a fast dissolving product. Moreover, for compositions such as bubblebaths with contain a relatively high amount of active ingredient, spray drying is the most economical method of production.

The present invention is based on the discovery that these numerous problems can be overcome through utilization of a specific formulation which is particularly amenable to the spray drying process.

In accordance with the present invention there have been discovered dry powder detergent compositions in the form of spray-dried beads which consist essentially of the following ingredients in percent by weight:
  a. the sodium or potassium salt of a sulfonated alpha-olefin surface active agent having from 10 to 22 carbon atoms, 10 to 15%;
  b. sodium or potassium linear alkyl benzene sulfonate, the alkyl having 10 to 20 carbon atoms, 1 to 3%;
  c. water soluble starch hydrolysate having a dextrose equivalent between about 15 and 44, 1 to 3%;
  d. magnesium sulfate heptahydrate, 18 to 25%;
  e. sodium chloride, 8 to 12%; and
  f. sodium or potassium sulfate, 40 to 60%.

The aforesaid formulation is prepared quite readily by conventional spray drying techniques. Most importantly, the compositions of the present invention are provided in the form of hollow, spherical beads which retain their physical form, are free flowing, have suppressed dusting tendencies, exhibit good foaming characteristics for use as a bubblebath composition and have a bulk density within a commercially acceptable range.

The alpha-olefins, which are sulfonated to form the surfactants used in the compositions of the present invention, may contain from about 10 to 22 carbon atoms and preferably will have 12 to 18 carbon atoms. They may be derived from a variety of processes such as, for example, by wax cracking, ethylene build up or dehydration of the corresponding primary alcohol.

Exemplary alpha-olefins are 1-decene, 1-undecene, 1-dodecene, 1-tridecene, 1-tetradecene, 1-pentadecene, 1-hexadecene, 1-heptadecene, 1-octadecene and the like and mixtures of the aforesaid. Sulfonation of these long chain olefins is typically carried out utilizing sulfur trioxide mixed with a diluent. After the sulfonation is completed, neutralization and hydrolysis of the acid mixture is carried out so that any by-product sultones which are formed are converted to the corresponding hydroxy-alkane sulfonates. Thus, as is well known in the art as evidenced by U.S. Pat. Nos. 3,332,876 and 3,506,580, the term sulfonated alpha-olefin surfactant as used herein includes not only the alkene sulfonate itself but also admixtures of same formed as a result of the usual sulfonation neutralization, and hydrolysis procedure with substantial proportions of the corresponding water soluble hydroxy-alkane sulfonates. Generally speaking, the sulfonated alpha-olefin surfactants used in the compositions of the present invention will be composed of about 40 to 60% of alkene sulfonate itself and about 60 to 40% of the corresponding hydroxy-alkane sulfonate, and preferably about 50% of each of the aforesaid makes up the sulfonated alpha-olefin surfactant.

The aforesaid sulfonated alpha-olefins may be neutralized in the form of the sodium or potassium salts, the sodium form being more preferable. The sulfonated alpha-olefin surfactant will be employed in the compositions of the present invention in an amount ranging from 10 to 15% and most suitably and preferably between 12 and 14%.

Small proportions of a second surfactant are also employed. This surfactant is a linear alkyl benzene sulfonate, sodium or potassium salt, in which the alkyl group has 10 to 20, preferably 12 to 16, carbon atoms and is employed in an amount ranging from 1 to 3%. Preferably about 2% of the sodium salt is used.

The third essential component of the compositions of the present invention is a water-soluble starch hydrolysate which is a starch carbohydrate which has been subjected to acid or enzyme (amylase, e.g.) catalyzed hydrolysis. While these materials are utilized only within the range of 1 to 3%, nevertheless, their use has been found highly essential to the production of a spray-dried bead which is resistant to physical decomposition. These hydrolysates, which are employed preferably at about the 2% level, are characterized as having a dextrose equivalent between about 15 and 44. Particularly preferred are corn starch hydrolysates which have a dextrose equivalent of 15 to 20. The starches may also be derived from sources such as wheat, rice, potato and the like. These water-soluble starch hydrolysates are composed mainly of higher polysaccharides but significant proportions of di- to hexa-saccharides are present to impart water solubility.

Epsom salts and sodium chloride are also employed within certain controlled proportions. Epsom salts, or magnesium sulfate heptahydrate, is present in an amount of from about 18 to 25% and preferably at about the 20% level. Sodium chloride is used generally in the 8 to 12% range and preferably at the 10% level. The employment of these inorganic constituents in relatively minor amounts has been found essential to produce a bead which has suppressed dusting tendencies and a bulk density within the range of 0.20 to 0.25 g/cc. (grams per cubic centimeter).

The final essential ingredient is the usual sodium or potassium sulfate filler. The exact amount will, of course, be dependent on the quantities of other components used. Generally speaking, the amount will vary over the 40–60% range and preferably within the range of 50 to 55% by weight.

Essential to the practice of the present invention is the utilization of the aforesaid components within the ranges of proportions defined herein. It has been found that even very minor deviations from the critical ratios of proportions result in products containing one or more serious deficiencies which render them unsuitable as commercially saleable detergent compositions.

The compositions described herein will have a bulk density in the range of 0.20 to 0.25 g/cc. which is important for packaging requirements and exhibit good foaming properties which make them particularly suitable for use as bubblebath formulations.

Of course, the compositions of the present invention may contain small proportions of various special purpose additives such as perfumes, coloring agents, buffering agents such as sodium citrate, a particularly preferred additive at about the 0.25-1.5% level, sequestering agents and the like so long as these additives do not deleteriously effect the overall formulation. Such additives may be incorporated either before or after the spray drying is carried out.

The spray drying conditions are somewhat variable and generally air inlet temperatures of 700° to 840°F. and air outlet temperatures of 240° to 200°F. are used. The pressure at which the slurry is pumped to the spray nozzles may be in the range of 250 to 600 p.s.i.g. The slurry concentration will be from 40 to 70% by weight a concentration at about 65% by weight solids producing the best viscosity.

The invention is further illustrated by the following examples which are not to be considered as limitative of its scope. All percentages are by weight.

EXAMPLE 1

A spray dried bubblebath composition is prepared having the following composition:

| | |
|---|---|
| (a) Sodium $C_{14}$—$C_{16}$ alpha-olefin sulfonate | 13% |
| (b) Sodium n-dodecyl benzene sulfonate | 2% |
| (c) Water soluble corn starch hydrolysate having a dextrose equivalent of 15-20 | 2% |
| (d) Magnesium sulfate heptahydrate | 20% |
| (e) Sodium Chloride | 10% |
| (f) Sodium Sulfate | 53% |

The composition is prepared by spray draying from a slurry having a concentration of 65% solids which was pumped at a pressure of 270-300 p.s.i.g. An air inlet temperature of 700°F. and an air inlet temperature of 250°-265°F. is used. The product produced in a free-flowing, dust-free bead having a bulk density of 0.225 g/cc. The Ross-Miles foam test results are as follows:

Foam Height — 150 ppm. Hardness Water, 25°C.

| Conc. | 0 Min. | 1 Min. | 5 Min. |
|---|---|---|---|
| 0.044% | 112 min. | 97 min. | 94 min. |

EXAMPLES 2-6

For comparative purposes, spray dried compositions are prepared having the following ranges of proportions, the ingredients (a) through (f) corresponding exactly to the (a) through (f) ingredients of Example 1. Spray drying conditions are the same as Example 1. Comments are given below with regard to the properties of each of the spray dried products produced.

EXAMPLE

| Component | 2(%) | 3(%) | 4(%) | 5(%) | 6(%) | 7(%) |
|---|---|---|---|---|---|---|
| (a) | 15 | 10 | 15 | 10 | 15.5 | 2 |
| (b) | 5 | 5 | None | 2 | 2 | 2 |
| (c) | 5 | 5 | 10 | 2 | 17 | None |
| (d) | None | None | 15 | 5 | 8.5 | 2 |
| (e) | 15 | 15 | None | 10 | None | 10 |
| (f) | 60 | 65 | 60 | 73 | 57 | 66 |

Example 2: A relatively high density product, about 0.3 g/cc. is produced and the bead is too fragile for packaging operations.

Example 3: An extremely dusty product is obtained with wide variations in density.

Example 4: Again the product dusts excessively indicating that a bead of unacceptable quality is produced.

Example 5: A very high density product, 0.4-0.5 g/cc. is obtained which dusts excessively.

Example 6: This product has an extremely high density, 0.73 g/cc. and dusts excessively.

Example 7: The product is too dusty to be of any practical value.

In each of Examples 2-7, a spray dried bead is produced which is clearly unsuitable for commercial use. Even what appear to be minor changes in the formulations of the present invention cause a total breakdown of the product.

What is claimed is:

1. A dry powder detergent composition in the form of a spray dried bead which consists essentially of, by weight:
    a. the sodium or potassium salt of a sulfonated alpha-olefin detergent having from 10 to 22 carbon atoms, 10 to 15%;
    b. sodium or potassium linear $C_{10}$–$C_{20}$ alkyl benzene sulfonate, 1 to 3%;
    c. water soluble starch hydrolysate having a dextrose equivalent between about 15 and 44, 1 to 3%;
    d. magnesium sulfate heptahydrate, 18 to 25%;
    e. sodium chloride, 8 to 12%; and
    f. sodium or potassium sulfate, 40 to 60%.

2. A composition according to claim 1 wherein there is present from 12 to 14% of said (a) ingredient; about 2% of said (b) ingredient; about 2% of said (c) ingredient; about 20% of said (d) ingredient; about 10% of said (e) ingredient and about 50 to 55% of said (f) ingredient.

3. A composition according to claim 1 wherein said (a) ingredient is the sodium salt of a sulfonated alpha-olefin containing 12 to 18 carbon atoms and said (b) ingredient is a sodium linear alkyl benzene sulfonate wherein the alkyl group has 12 to 16 carbon atoms.

4. A composition according to claim 1 which has a bulk density between 0.20 and 0.25 g/cc.

5. A composition according to claim 1 which is prepared by spray drying utilizing an air inlet temperature of 700° to 840°F. and an air outlet temperature of 240° to 260°F.

* * * * *